(12) United States Patent
Sibley et al.

(10) Patent No.: US 8,151,201 B2
(45) Date of Patent: Apr. 3, 2012

(54) USER INTERFACE MANAGER AND METHOD FOR REACTING TO A CHANGE IN SYSTEM STATUS

(75) Inventors: Richard Paul Sibley, Kitchener (CA); Neil Adams, Waterloo (CA); Ravi Singh, Mississauga (CA)

(73) Assignee: Research In Motion Limited, Waterloo (CA)

( * ) Notice: Subject to any disclaimer, the term of this patent is extended or adjusted under 35 U.S.C. 154(b) by 825 days.

(21) Appl. No.: 11/465,297

(22) Filed: Aug. 17, 2006

(65) Prior Publication Data

US 2008/0046827 A1 Feb. 21, 2008

(51) Int. Cl.
*G06F 3/00* (2006.01)
*G06F 3/048* (2006.01)
(52) U.S. Cl. ........................ 715/762; 715/794
(58) Field of Classification Search .................. 715/750, 715/762, 794
See application file for complete search history.

(56) References Cited

U.S. PATENT DOCUMENTS

| 5,796,397 | A | 8/1998 | Kusano | |
|---|---|---|---|---|
| 6,430,570 | B1 | 8/2002 | Judge et al. | |
| 6,874,145 | B1 * | 3/2005 | Ye et al. | 718/108 |
| 7,150,002 | B1 * | 12/2006 | Anderson et al. | 717/107 |
| 2002/0016879 | A1 * | 2/2002 | Miller | 710/200 |
| 2003/0120712 | A1 | 6/2003 | Reid | |
| 2004/0075701 | A1 | 4/2004 | Ng | |
| 2005/0097506 | A1 * | 5/2005 | Heumesser | 717/102 |
| 2005/0117523 | A1 * | 6/2005 | Parupudi et al. | 370/252 |
| 2005/0223352 | A1 | 10/2005 | Nishida | |
| 2005/0229247 | A1 * | 10/2005 | Ishidera | 726/17 |
| 2005/0235139 | A1 | 10/2005 | Hoghaug et al. | |
| 2005/0270855 | A1 * | 12/2005 | Earhart et al. | 365/189.05 |
| 2007/0179973 | A1 * | 8/2007 | Brodie et al. | 707/104.1 |
| 2008/0046827 | A1 * | 2/2008 | Sibley et al. | 715/751 |
| 2008/0047004 | A1 * | 2/2008 | Sibley et al. | 726/20 |
| 2008/0184228 | A1 * | 7/2008 | Tsao | 718/1 |

FOREIGN PATENT DOCUMENTS

DE 10065211 A1 5/2002

OTHER PUBLICATIONS

AAPA—"Applicant Admitted Prior Art"—background section of current application.*
Partial European Search Report issued on Mar. 23, 2007 in connection with EP 06119122.7.1.

(Continued)

*Primary Examiner* — Doug Hutton, Jr.
*Assistant Examiner* — Soumya Dasgupta
(74) *Attorney, Agent, or Firm* — Ridout & Maybee LLP (57) ABSTRACT

A user interface manager, interposed between a Windows service and user interface modules that communicate with the Windows service in distinct system status scenarios, can record interaction between the Windows service and each of the user interface modules. The recorded interaction, along with information collected from the user interface modules, can be used in conjunction so that user interaction with a first one of the user interface modules may continue with a second one of the user interface modules after a switch from one system status (e.g., logged on) to another system status (e.g., locked). Alternatively, responsive to the switch from one system status to another system status the user interface manager may simply stop the executing user interface module so that the interaction may be started over in the new system status.

18 Claims, 4 Drawing Sheets

OTHER PUBLICATIONS

Bahar Abdul (Rajib), Authentication against Active Directory and Edirectory via LDAP, Feb. 28, 2004 http://www.codeproject.com/dotnet/arbauthentication.asp?df=100&forum1d=32468&exp=)&fr=51&select=742142>.

International Business Machines Corporation, Diary as Screen Saver, Research Disclosure, Mason Publications, Hampshire, GB, vol. 451, No. 119, Nov. 2001.

Deshdeep Singh, Atmosphere—the developer blog of Bernard Wong from the subliminal to the sublime . . . , introducing GINA (that's Graphical Identification and Authentication to you . . . ). MSND Blogs. Aug. 5, 2004. p. 1 to 3. http://blogs.msdn.com/bwong_ms/archive/2004/03/20/93350.aspx.

Extended European Search Report, dated Jul. 13, 2009, relating to Application No. 07800464.5.

* cited by examiner

USER INTERFACE MANAGER AND METHOD FOR REACTING TO A CHANGE IN SYSTEM STATUS

FIELD OF THE INVENTION

The present application relates generally to user interfaces and, more specifically, to a user interface manager and method for reacting to a change in system status.

BACKGROUND OF THE INVENTION

It is common practice to configure a computer workstation so that the workstation can be used by several different users. To maintain personalized settings and privacy among the users in the context of the use of the workstation, an operating system for such a workstation typically provides a logon user interface. A user completes an authentication process through interaction with the logon user interface to gain access to the applications that are available to be executed on the workstation. It follows that the workstation may be considered to have a logged off system status and a logged on system status. Furthermore, responsive to direct user instruction, or due a period of inactivity, the workstation may become locked. That is, the workstation may present the logon user interface and require the user to complete the authentication process over again to return to accessing various applications executed by the workstation. The locked system status may be considered very similar to the logged off system status.

There are known to exist computer peripheral devices for which a workstation-to-peripheral connection may be established without regard for the system status of the workstation. Such connections have corresponding authentication protocols and, therefore, need not rely on the authentication protocols handled by the workstation operating system. Notably, establishment of a workstation-to-peripheral connection generally requires user input and the workstation may require multiple user interface modules with a selection of a particular user interface module being dependent upon system status.

However, it has been discovered that a problem arises in a scenario wherein the workstation performs a transition from the logged on system status to the locked system status while establishment of a workstation-to-peripheral connection is ongoing. If, while the workstation had the logged on system status, the user had started, but not completed, establishing a workstation-to-peripheral connection, the user may be prevented from establishing a workstation-to-peripheral connection once the workstation has the locked system status. It is likely, in such a scenario, that the application executed by the workstation to allow for the establishment of a workstation-to-peripheral connection awaits further user input, which user input is prevented by the locked system status.

BRIEF DESCRIPTION OF THE DRAWINGS

Reference will now be made to the drawings, which show, by way of example, embodiments of the invention, and in which.

DETAILED DESCRIPTION OF THE EMBODIMENTS

According to one example embodiment, there is provided a method of managing multiple user interfaces, said method comprising: detecting a change in system status from a current system status to a new system status; responsive to said detecting, transmitting a state request to a first user interface module; receiving a state response from said first user interface module, said state response including a control-state data structure; and transmitting said control-state data structure to a second user interface module.

According to another example embodiment is a computing apparatus for managing multiple user interfaces, said computing apparatus comprising a processor adapted to: detect a change in system status from a current system status to a new system status; transmit, responsive to said detecting, a state request to a first user interface module; receive a state response from said first user interface module, said state response including a control-state data structure; and transmit said control-state data structure to a second user interface module.

According to another example embodiment, is a computer readable medium containing computer-executable instructions that, when performed by processor, cause said processor to: detect a change in system status from a current system status to a new system status; transmit, responsive to said detecting, a state request to a first user interface module; receive a state response from said first user interface module, said state response including a control-state data structure; and transmit said control-state data structure to a second user interface module.

According to another example embodiment is a method of managing multiple user interfaces on a computing apparatus, said method comprising: receiving a request to initiate a user interface module related to a Windows service; determining a current system status for said computing apparatus; based on said determining, selecting a candidate user interface module from among a plurality of user interface modules; initiating said candidate user interface module; receiving an indication of a change to a new system status; and canceling currently active threads of said candidate user interface module.

According to another example embodiment is a computing apparatus for managing multiple user interfaces, said computing apparatus comprising a processor adapted to: receive a request to initiate a user interface module related to a Windows service; determine a current system status for said computing apparatus; select, based on said determining, a candidate user interface module from among a plurality of user interface modules; initiate said candidate user interface module; receive an indication of a change to a new system status; and cancel currently active threads of said candidate user interface module.

According to another example embodiment, is a computer readable medium containing computer-executable instructions that, when performed by processor in a computing apparatus, cause said processor to: receive a request to initiate a user interface module related to a Windows service; determine a current system status for said computing apparatus; select, based on said determining, a candidate user interface module from among a plurality of user interface modules; initiate said candidate user interface module initiate said candidate user interface module; receive an indication of a change to a new system status; and cancel currently active threads of said candidate user interface module.

It is noted at www.wikipedia.org that, in computing, "Winlogon" is a component of Microsoft Windows operating systems that is responsible for handling a secure attention key, loading a user profile on logon and, optionally, locking the computer when a screensaver is running (requiring another authentication step). The obtaining and verification of user credentials is left to other components.

Winlogon handles interface functions that are independent of authentication policy. Winlogon creates desktops for the workstation, implements time-out operations, provides a set of support functions for a Graphical Identification and Authentication (GINA) library and takes responsibility for configuring Group Policy for machine and user.

The GINA library is a component of some Microsoft Windows operating systems that provides secure authentication and interactive logon services. The GINA library is a dynamically linked library (DLL) that is loaded in the context of the Winlogon process when the machine is started. The GINA library is responsible for handling a secure attention sequence, typically Control-Alt-Delete, and interacting with the user when this sequence is received. The GINA library, alternatively referred to as simply "GINA", is also responsible for starting an initial processes for a user (such as the Windows Shell) when the user first logs on.

Winlogon is, by default, configured to use a default GINA. Winlogon can be configured to use a different GINA, thereby providing for non-standard authentication methods and/or providing for a visual user interface that is different than the visual user interface that is provided by the default GINA.

A file representative of the GINA DLL is typically located in the System32 folder and can be replaced with a file representative of a customized GINA DLL that provides alternative user identification and authentication procedures, such as those authentication procedures that depend on communication with a biometric peripheral device.

Exemplary non-standard authentication methods may involve a smart card reader and may involve identifying a user based on biometrics. Developers who implement a replacement GINA are required to provide implementations for a set of application programming interface (API) calls, which cover functionality such as displaying a "workstation locked" dialog, processing the secure attention sequence in various user states, responding to queries as to whether or not locking the workstation is an allowed action, supporting the collection of user credentials on Terminal Services-based connections and interacting with a screen saver. The Winlogon component is solely responsible for calling these APIs in the GINA library.

A Windows "service" is an application that starts when the Windows operating system is booted and runs in the background as long as Windows is running. Windows provides an interface called a Service Control Manager (SCM) that manages creating, deleting, starting and stopping of services. An application that is to be registered as a service needs to be written in such a way that the application can handle messages (start, stop, pause, etc.) from the SCM. Then, in one or more API calls, the name of the service and other attributes, such as the description of the service, may be registered with the SCM.

Windows services are, by default, run as a virtual user that is associated with an account called "LocalSystem". Since LocalSystem is not a real user, some challenges present themselves when user-specific data needs to be stored by the service, as there is no home directory for the user associated with the LocalSystem account.

The SCM maintains a database of registered services and includes information on how each service should be started. The SCM also enables system administrators to customize security requirements for each service and, thereby, control user access to the service.

If a given service is running in the context of the LocalSystem account and has an attribute known as the SERVICE_INTERACTIVE_PROCESS attribute, the given service is known as an interactive service. An interactive service can display a graphical user interface (GUI) and receive user input.

It is known that running an interactive service under the context of the LocalSystem account is a dangerous practice and should be avoided. It has been suggested that, if a service that is running on a multi-user system must interact with a user, the service should do so through a separate GUI module, where the separate GUI module is run under the context of a user account. It has been further suggested that the separate GUI module should be designed to communicate with the service through some method of interprocess communication, such as a named pipe. This combination of a separate GUI module with a service is known as a client/server implementation and serves as an alternative to running an interactive service under the context of the LocalSystem account.

When it is necessary for a thread of a GUI module to transmit a message to a Windows service, where the message requires a response, the thread may create an entry on a "thread map", implemented, for example, as a map or a list. Each entry in the thread map may be considered to include two parts: a response type; and a reference to a message transfer object. Examples of response types could include among other things a response to a version check request, a response to a synchronize settings request, and a response to a set IT policy request.

The message transfer object contains: a flag indicating whether a response has been received; an event on which the thread should wait; and a response data field to hold data received in the response. Events on which the thread should wait can for example include an outstanding response to a previous request. An event can for example be a handle.

Before sending a message for which a response is expected, a sending thread first creates a message transfer object. The sending thread then places an entry in the thread map. Recall that the entry includes an indication of a unique response type (i.e., the response type for which the sending thread will wait) and a reference to the message transfer object. The sending thread then transmits the message. The sending thread then waits for an event, where the event is receipt of a response message having the unique response type.

A single thread known as a receiver thread is responsible for reading incoming messages, determining whether the incoming message is a response to a message sent by one of the sending threads and, if so, waking up the appropriate sending thread. The receiver thread idles until a message is received. Upon receiving an incoming message, the receiver thread reads the message type of the incoming message. The receiver thread compares the message type of the incoming message against the response type of each entry in the thread map. If the receiver thread finds an entry in the thread map with a response type that matches the message type of the incoming message, the receiver thread sets the response flag of the matching entry to "true", copies the incoming message into the response data field, removes the entry from the thread map and signals the "receipt of a response message" event.

The sending thread may continue upon recognizing that the "receipt of a response message" event has occurred. Upon continuing, the sending thread reviews the response flag in the message transfer object. If the response flag has a value of "true", then a response has been received and the response data field of the message transfer object may be expected to contain the response. If the response flag has a value of "false", then a response has not been received.

Separate user interface modules may exist as clients to a Windows service. For instance, a first user interface module may be used as a first client to a given Windows service when the workstation has a logged off system status or a locked system status and a second user interface module may be used as a second client to the given Windows service when the workstation has a logged on system status. The first user interface module has a first message engine for handling messages between threads in the first user interface module and the given Windows service. Similarly, the second user interface module has a second message engine for handling messages between threads in the second user interface module and the given Windows service.

Consider the case wherein the given Windows service communicates with a proximate device using the known Bluetooth communication protocol. Such a Windows service may require user interaction to select a device to which to connect and may further require user entry of a passkey. Also consider a scenario in which a user is in the midst of establishing a Bluetooth connection through the use of the second user interface module, i.e., while logged on, when the workstation locks. Conventionally, the user would be unable to use the first user interface module, i.e., the user interface module designed for use when the workstation has a locked system status, to establish a Bluetooth connection while faced with the logon user interface because a thread in the second user interface module is still waiting for user input for transmitting to the Windows service responsible for establishing the Bluetooth connection.

In overview, to police the user interface modules and direct messages to the correct user interface module, a user interface manager module may be implemented. Responsive to a change in system status, the user interface manager module determines the state of the first user interface module and transmits an indication of the state of the first user interface module to the second user interface module. Additionally, the user interface manager module copies entries from a thread map associated with the first user interface module to a thread map associated with the second user interface module.

Figure 1:
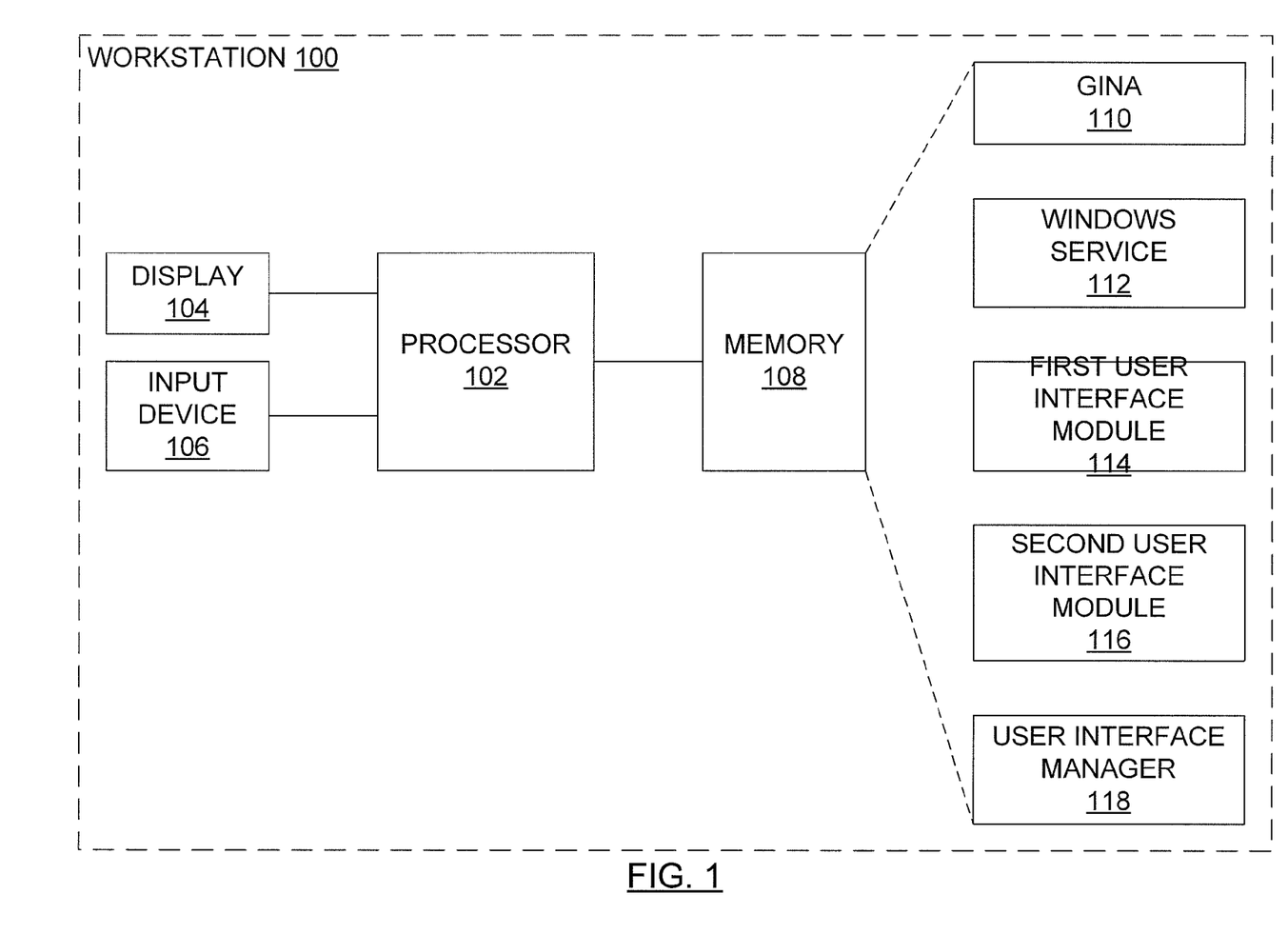
FIG. 1 illustrates a workstation adapted to embody aspects of the present application.

FIG. 1 illustrates a workstation 100 including, as is typical, a processor 102 and, in communication with the processor 102, a display 104, an input device 106 and a memory 108. The processor 102 may execute various software entities and modules for executing methods exemplary of this application. The software entities and modules are illustrated in FIG. 1 as GINA 110, Windows service 112, first user interface module 114, second user interface module 116 and user interface manager 118. The software entities and modules may be loaded on the memory 108 from a disk, a tape, a chip or a random access memory containing a file downloaded from a remote source.

Figure 2:
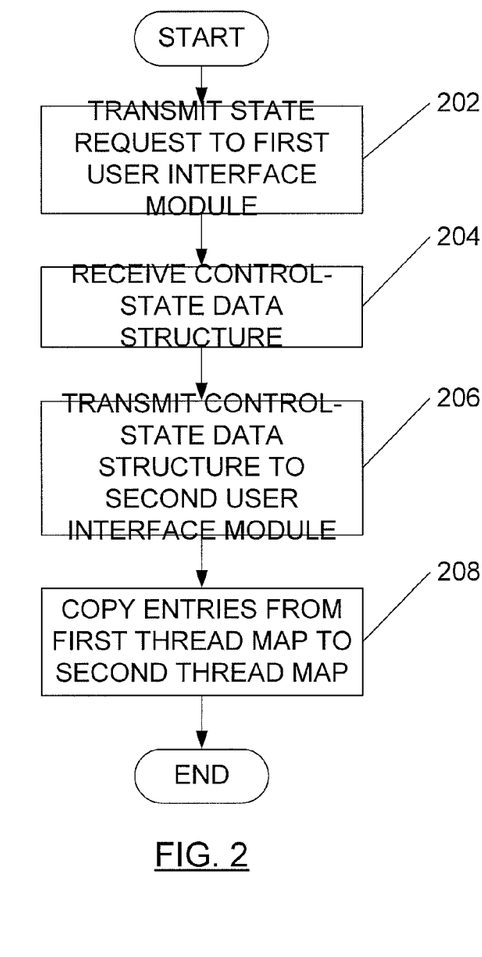
FIG. 2 illustrates exemplary steps of a method of managing user interfaces responsive to a change in system status from a current system status to a new system status according to one embodiment.
Figure 3:
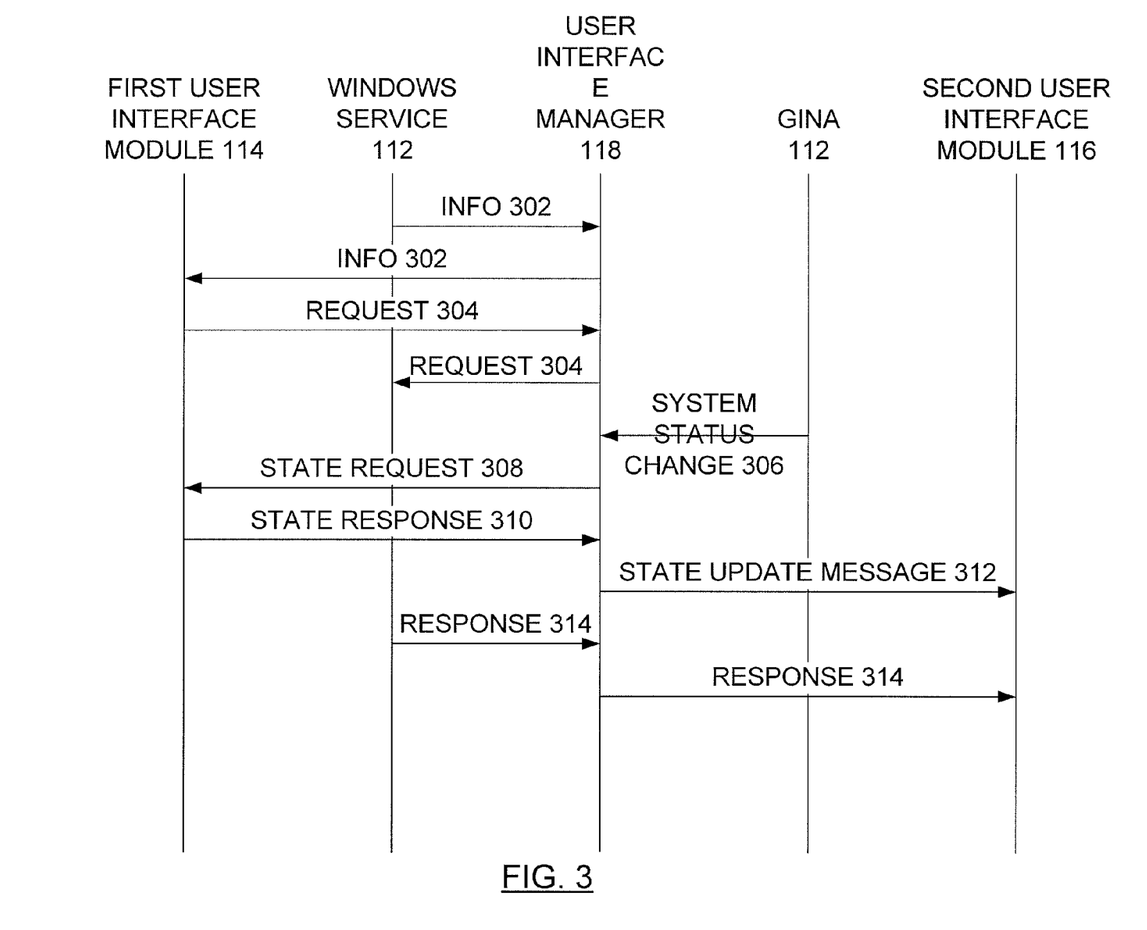
FIG. 3 illustrates a message flow related to execution of the exemplary steps of FIG. 2.

FIG. 2 illustrates exemplary steps of a method of managing user interfaces responsive to a change in system status from a current system status to a new system status. FIG. 3 illustrates a message flow related to execution of the exemplary steps of FIG. 2. With reference to FIG. 3, in an initial condition, the first user interface module 114 is communicating with the Windows service 112. In particular, FIG. 3 illustrates the Windows service 112 transmitting an information message 302 to the user interface manager 118. Notably, where the first user interface module 114 would normally be registered with the Windows service 112, the user interface manager 118 is registered instead. The user interface manager 118 receives the information message 302 and, based on the current system status (i.e., logged on), selects the first user interface module 114 as the destination.

The first user interface 114 receives the information message 302 from the user interface manager 118 and generates a request message 304. Rather than send the request message 304 directly to the Windows service 112, the first user interface module 114 transmits the request message 304 to the user interface manager 118.

Where the request message 304 requires a response from the Windows service 112, the first user interface module 114 creates a message transfer object and places an entry in a thread map associated with the first user interface module 114, where the entry includes a reference to the message transfer object. The user interface manager 118 then forwards the request message 304 to the Windows service 112.

A change in system status then occurs. Exemplary system status changes include: logged off to logged on; logged on to logged off; logged on to locked; and locked to logged on. The GINA library 110 typically handles the event (e.g., a secure attention sequence, such as Control-Alt-Delete) that leads to the change in system status. As such, the GINA library 110 handles the sending of a message 306, indicating the change in system status, to the user interface manager 118.

Responsive to receiving the message 306 indicating the change in system status, the user interface manager 118 transmits (step 202, FIG. 2) a state request message 308 to the first user interface module 114. The first user interface module 114 formulates a state response message 310 by generating a control-state data structure that includes the state of the first user interface module 114. The information included in the control-state data structure may include: an indication of which dialog is displayed; an indication of which field of the dialog is in focus; and an indication of the contents of all of the fields of the dialog. The first user interface module 114 then transmits the state response message 310 to the user interface manager 118.

Upon receiving (step 204) the state response message 310, the user interface manager 118 formulates a state update message 312 to include the control-state data structure received in the state response message 310. The user interface manager 118 then transmits (step 206) state update message 312 to the second user interface module 116. Additionally, the user interface manager 118 copies (step 208) entries from the thread map associated with the first user interface module 114 to a thread map associated with the second user interface module 116 (such that the thread map associated with t second user interface 312 will include a thread waiting for the response to the request message 304).

The Windows service 112 then transmits a response message 314 to the user interface manager 118, where the response message 314 is a response to the request message 304. The user interface manager 118 receives the response message 314 and, based on the system status having changed, selects the second user interface module 116 as the destination.

A receiver thread of the second user interface module 116 receives the response message 314 from the user interface manager 118 and matches the message type of the response message 314 with the entry associated with the request message 304 in the thread map associated with the second user interface module 116. The receiver thread then generates an event that wakes up the thread waiting for a response to the request message 304.

Returning to the case wherein the given Windows service is a Bluetooth connection service and the scenario in which a user is in the midst of establishing a Bluetooth connection through the use of the second user interface module. The user may have, for instance, used a device-selection dialog of the second user interface module to select a proximate Bluetooth-enabled device. Additionally, the user may have, for instance, entered the first two digits of a four-digit passkey in an alphanumeric entry field of a passkey-entry dialog of the second user interface module before the workstation locked. Responsive to the locking of the workstation, the user interface manager transmits a state request to the second user interface module and receives a state response. The state response includes a control-state data structure that indicates that a passkey-entry dialog was open, that two digits have been received and the value of the two digits.

In the locked system status, the user requests initiation of a user interface module. The user interface manager, based on the locked system status, selects and initiates the first user interface module. Additionally, the user interface manager sends a state update message to the first user interface module. The state update message includes the control-state data structure that indicates that a passkey-entry dialog was open, that two digits have been received in the alphanumeric entry field and the value of the two digits. Upon initiation, the first user interface module presents the user with the passkey-entry dialog showing, in the alphanumeric entry field, that two digits have been received. Conventionally, the indication that a digit of a passkey has been received is accomplished with displaying, in the alphanumeric entry field, an asterisk ("*"). However, other symbols may be used, such as a period (".") or a bullet ("•").

While the copying (step 208) of the thread map associated with the second user interface module to the thread map associated with the first user interface module provides enough information to allow a thread of the first user interface module to await completion of the entry of the passkey, it is the information contained in the control-state data structure received in the state update message 312 that allows the first user interface module to present the passkey-entry dialog in the state that the dialog was in at the time of locking.

Advantageously, the above-proposed solution allows the user to seamlessly use a dialog interface to interact with, and provide input for, a Windows service in three situations: when a user is logged on; when the work station is locked; and when no user is logged on.

As will be apparent to a person of ordinary skill in the art, the user interface module designed for use when the system status is logged-off/locked may be integrated into a customized GINA library.

As an alternative to determining and transferring an indication of state of user interface module, responsive to receiving a message indicating a change in system status from GINA, the user interface manager may simply arrange to cancel the currently active threads of whichever user interface module is in use. Thereafter, in the new system status, the user may initiate interaction with the Windows service. Responsively, the user interface manager selects the appropriate one of the user interface modules and the user is required to enter data from the beginning.

Figure 4:
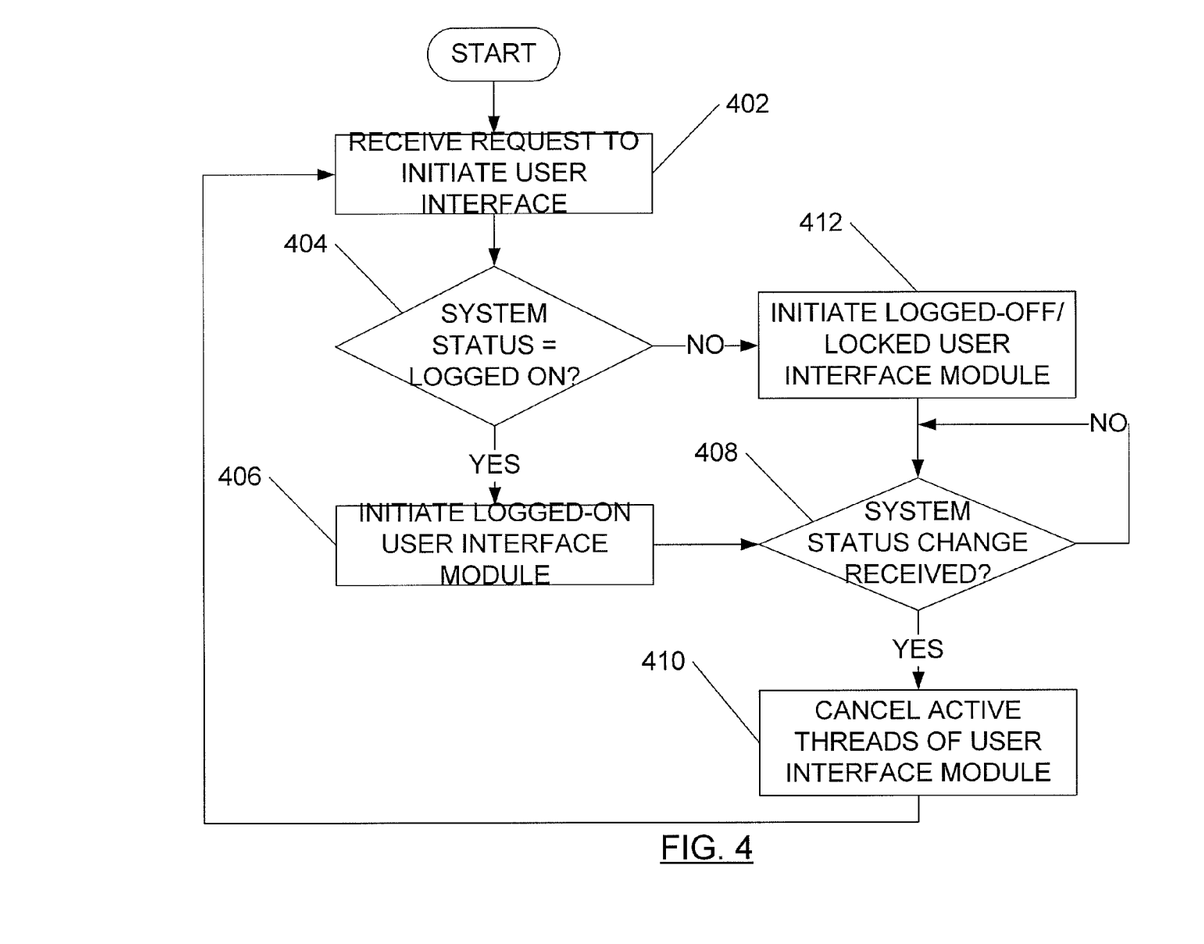
FIG. 4 illustrates exemplary steps of a method of managing multiple user interfaces to a service according to another embodiment.

FIG. 4 illustrates exemplary steps of a method of managing multiple user interfaces developed for use with a single Windows service. Initially, a user interface manager receives (step 402) a request to initiate a user interface to a Windows service. The user interface manager then determines (step 404) the status of the system. If the user interface manager determines that the system status is "logged on", the user interface manager selects the logged-on user interface module and initiates (step 406) the logged-on user interface module. While the logged-on user interface module is executing, the user interface manager may determine (step 408) that a system status change message has been received. If the user interface manager determines (step 408) that a system status change message has been received, the user interface manager arranges to cancel (step 410) the currently active threads of the logged-on user interface module. If the user interface manager determines (step 408) that a system status change message has not been received, the user interface manager continues to monitor for such receipt.

Canceling (step 410) the currently active threads of the logged-on user interface module may involve, for instance, removing each entry from the thread map associated with the currently active threads and generating events instructing each of the currently active threads to terminate. Such canceling may be considered equivalent to the reaction such a user interface module would have to a user selecting a "Cancel" button on a dialog presented by the user interface module. The result is that the user interface module returns to an idle state.

Advantageously, once the logged-on user interface module has returned to an idle state, the logged-on user interface no longer awaits further user input and a new user interface module may communicate with the Windows service without restriction.

In the new system status, the user interface manager may, again, receive (step 402) a request to initiate a user interface to the Windows service. The user interface manager then determines (step 404) the status of the system. If the user interface manager determines that the system status is "logged off" or "locked", the user interface manager selects the logged-off/locked user interface module and initiates (step 412) the logged-off/locked user interface module. While the logged-off/locked user interface module is executing, the user interface manager may determine (step 408) that a system status change message has been received. If the user interface manager determines (step 408) that a system status change message has been received, the user interface manager arranges to cancel (step 410) the currently active threads of the logged-off/locked user interface module. If the user interface manager determines (step 408) that a system status change message has not been received, the user interface manager continues to monitor for such receipt.

Although, as presented in the exemplary steps of the method of FIG. 4, there are only two user interface modules to choose between, a person of ordinary skill in the art would recognize that a plurality of user interface modules may be made available, one user interface module for each system status. As such, selecting (step 404) a candidate user interface module to initiate, based on the system status, may be more complex than simply determining whether the workstation has logged-on system status.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of managing multiple user interfaces, said method comprising:
    executing a first user interface module;
    detecting, via an operating system component that provides authentication and logon services, an impending change in system status;

from a logged-on system status to a logged-off system status or a locked system status; or from said logged-off system status or said locked system status to said logged-on system status;

responsive to said detecting, transmitting a state request to a first user interface module, said first user interface module having a thread awaiting a message;

receiving a state response from said first user interface module, said state response including a data structure, wherein said data structure includes an indication of a state of a dialog displayed by said first user interface module, said dialog associated with said thread;

executing a second user interface module after completion of said change in system status;

transmitting said data structure to said second user interface module; and copying, from a first list associated with said first user interface module to a second list associated with said second user interface module, an identity of said message.

2. The method of claim 1 wherein the data structure includes information retrieved from the first user interface module and that is used by the second user interface module to adjust a user interface generated thereby.

3. The method of claim 1 wherein said identity includes a type for said message.

4. The method of claim 1 wherein said identity includes a reference to a message transfer object, said message transfer object comprising:

a flag indicating whether said message has been received;

an event, which said thread awaits; and a data field to hold data received in the message.

5. The method of claim 1 wherein said data structure includes an indication of a name of said dialog.

6. The method of claim 5 wherein said data structure includes an indication of contents of a field in said dialog.

7. A computing apparatus for managing multiple user interfaces, said computing apparatus comprising a processor adapted to:

execute a first user interface module;

detect, via an operating system component that provides authentication and logon services, an impending change in system status:

from a logged-on system status to a logged-off system status or a locked system status; or from said logged-off system status or said locked system status to said logged-on system status;

transmit, responsive to said detecting, a state request to a first user interface module, said first user interface module having a thread awaiting a message;

receive a state response from said first user interface module, said state response including a data structure, wherein said data structure includes an indication of a state of a dialog displayed by said first user interface module, said dialog associated with said thread;

execute a second user interface module after completion of said change in system status;

transmit said data structure to said second user interface module; and copy, from a first list associated with said first user interface module to a second list associated with said second user interface module, an identity of said message.

8. The computing apparatus of claim 7 wherein the data structure includes information retrieved from the first user interface module and that is used by the second user interface module to adjust a user interface generated thereby.

9. The computing apparatus of claim 7 wherein said identity includes a type for said message.

10. The computing apparatus of claim 7 wherein said identity includes a reference to a message transfer object, said message transfer object comprising:

a flag indicating whether said message has been received;

an event, which said thread awaits; and a data field to hold data received in the message.

11. The computing apparatus of claim 7 wherein said data structure includes an indication of a name of said dialog.

12. The computing apparatus of claim 11 wherein said data structure includes an indication of contents of a field in said dialog.

13. A non-transitory computer readable storage medium containing computer-executable instructions that, when performed by processor, cause said processor to:

execute a first user interface module;

detect, via an operation system component that provides authentication and logon services, an impending change in system status:

from a logged-on system status to a logged-off system status or a locked system status; or from said logged-off system status or said locked system status to said logged-on system status;

transmit, responsive to said detecting, a state request to a first user interface module, said first user interface module having a thread awaiting a message;

receive a state response from said first user interface module, said state response including a data structure, wherein said data structure includes an indication of a state of a dialog displayed by said first user interface module, said dialog associated with said thread;

execute a second user interface module after completion of said change in system status;

transmit said data structure to said second user interface module; and copy, from a first list associated with said first user interface module to a second list associated with said second user interface module, an identity of said message.

14. The non-transitory computer readable storage medium of claim 13 wherein the data structure includes information retrieved from the first user interface module and that is used by the second user interface module to adjust a user interface generated thereby.

15. The non-transitory computer readable storage medium of claim 13 wherein said identity includes a type for said message.

16. The non-transitory computer readable storage medium of claim 13 wherein said identity includes a reference to a message transfer object, said message transfer object comprising:

a flag indicating whether said message has been received;

an event, which said thread awaits; and a data field to hold data received in the message.

17. The non-transitory computer readable storage medium of claim 13 wherein said data structure includes an indication of a name of said dialog.

18. The non-transitory computer readable storage medium of claim 17 wherein said data structure includes an indication of contents of a field in said dialog.

* * * * *